United States Patent
Zilles et al.

(10) Patent No.: US 12,325,640 B2
(45) Date of Patent: Jun. 10, 2025

(54) SEQUESTERING OF CRYSTALLINE SILICON DIOXIDE

(71) Applicant: QUARZWERKE GmbH, Frenchen (DE)

(72) Inventors: Jörg Ulrich Zilles, Cologne (DE); Max Kellermann, Wesseling (DE); Paul Páez-Maletz, Frenchen (DE)

(73) Assignee: QUARZWERKE GmbH, Frenchen (DE)

( * ) Notice: Subject to any disclaimer, the term of this patent is extended or adjusted under 35 U.S.C. 154(b) by 831 days.

(21) Appl. No.: 17/426,461

(22) PCT Filed: Jan. 30, 2020

(86) PCT No.: PCT/EP2020/052286
§ 371 (c)(1),
(2) Date: Jul. 28, 2021

(87) PCT Pub. No.: WO2020/157193
PCT Pub. Date: Aug. 6, 2020

(65) Prior Publication Data
US 2022/0162080 A1  May 26, 2022

(30) Foreign Application Priority Data

Jan. 30, 2019 (EP) ..................................... 19154567
May 2, 2019 (EP) ..................................... 19172386

(51) Int. Cl.
*C01B 33/18* (2006.01)

(52) U.S. Cl.
CPC .......... *C01B 33/18* (2013.01); *C01P 2004/51* (2013.01); *C01P 2004/61* (2013.01); *C01P 2004/62* (2013.01); *C01P 2006/80* (2013.01)

(58) Field of Classification Search
CPC ......... C01B 33/18; C01B 33/181; C08K 3/36; C01P 2004/51; C01P 2004/61; C01P 2004/62; C01P 2006/80; A62D 3/30
See application file for complete search history.

(56) References Cited

U.S. PATENT DOCUMENTS

| 10,253,219 B2 | 4/2019 | Sato et al. |
| 2018/0127322 A1 | 5/2018 | Wu |

FOREIGN PATENT DOCUMENTS

| CN | 102180596 A | * | 9/2011 | ........... C03B 19/066 |
| CN | 103011840 A | * | 4/2013 | |
| JP | S50-18003 A | | 2/1975 | |
| JP | 2005-263566 A | | 9/2005 | |

(Continued)

OTHER PUBLICATIONS

Hasegawa, M., et al. "The effect of liquid additives on dry ultrafine grinding of quartz." Powder Technology 114. 1-3 (2001): 145-151.*

(Continued)

*Primary Examiner* — Richard M Rump
(74) *Attorney, Agent, or Firm* — Christensen, Fonder, Dardi PLLC; Diane E. Bennett; Peter S. Dardi

(57) ABSTRACT

A process for treating crystalline silicon dioxide, comprising the step of grinding a crystalline silicon dioxide together with from 0.05 to 1.00% by weight of a substance selected from the group consisting of polyhydric alcohols, kaolin, aluminum alcoholates, and mixtures thereof.

18 Claims, 2 Drawing Sheets
Specification includes a Sequence Listing.

(56) References Cited

FOREIGN PATENT DOCUMENTS

| | | | |
|---|---|---|---|
| JP | 2006-307229 A | 11/2006 | |
| KR | 2013-0000999 A | 1/2013 | |
| RU | 2616931 C1 | 4/2017 | |
| WO | WO-9963958 A1 * | 12/1999 | ............... A61K 8/25 |
| WO | 2016-031823 A1 | 3/2016 | |

OTHER PUBLICATIONS

English machien translation of JP2005263566 (2005).*

Kohobhange, S. P. K., et al. "The effect of prolonged milling time on comminution of quartz." Powder Technology 330 (2018): 266-274.*

International Search Report for corresponding European Patent Application No. PCT/EP2020/052286 dated Apr. 8, 2020.

Fubini, "Surface Chemistry and Quartz Hazard", Ann Occup Hyg, vol. 42 No. 8, p. 521-530, (Nov. 1998).

Le Bouffant et al., "The therapeutic action of aluminium compounds on the development of experimental lesions produced by pure quartz or mixed dust", Inhaled Part, p. 389-400, (Sep. 4, 1975).

Nattrass et al., "The effect of aluminium and sodium impurities on the in vitro toxicity and pro-inflammatory potential of cristobalite", Environmental Research, vol. 159, p. 164-175, (2017).

Examination Report from corresponding Indian Patent Application No. 202117033444 dated Jan. 2, 2023.

Communication from corresponding European Patent Application No. 20701793.0 dated Sep. 7, 2022.

Office Action from corresponding Japanese Patent Application No. 2021-544602 dated Oct. 31, 2023.

Office Action from corresponding Russian Patent Application No. 2021121350/04(044696) dated Jun. 16, 2023.

Office Action from corresponding Chinese Patent Application No. 2020800120562 dated Jun. 7, 2023.

* cited by examiner

SEQUESTERING OF CRYSTALLINE SILICON DIOXIDE

CROSS REFERENCE TO RELATED APPLICATIONS

This application is a National Stage filing of PCT Application No. PCT/EP2020/052286 filed Jan. 30, 2020, which claims priority to European Patent Application No. 19154567.2, filed Jan. 30, 2019, and European Patent Application No. 19172386.5, filed May 2, 2019, all of which are incorporated herein by reference.

The present invention relates to a process for treating crystalline silicon dioxide, and to the crystalline silicon dioxide flours thus obtained.

Silicosis, which is nodular pulmonary fibrosis, can be caused by the prolonged and intensive inhalation of alveolar respirable fractions of crystalline $SiO_2$, and upon chronic exposure, may lead to the formation of lung tumors. Therefore, the A fraction of quartz and cristobalite has been rated as a class 1 human carcinogen by the International Agency for Research on Cancer (IARC). However, the actual hazard originating from particular $SiO_2$ species is essentially dependent on their origin and on their chemical, thermal and mechanical processing, and the respective industrial exposure situation (IARC (1997), Silica, some silicates, coal dust and para-aramid fibrils. Lyon: IARC, pp. 41-240. ISBN 9 283 21268 1).

Having the same chemical and mineralogical composition of the $SiO_2$ matrix, surface-modified materials may have drastically different toxic potentials (Fubini (1998), Surface chemistry and quartz hazard. Ann Occup Hyg; 42(8): 521-30, and (1998a) Health effects of silica. In "The Surface Properties of Silica". New York: Wiley, pp. 415-464. ISBN 978 0 4719 5332 6).

In accordance with occupational and consumer safety, it would be desirable to modify crystalline silicon dioxide surfaces selectively to result in an inactivation of the undesirable biological activity described of the surface, but retention of the technologically important properties, such as the good wetting by aqueous solutions. Thus, the use of surface-modified $SiO_2$ flours could represent an additional measure of risk management for the protection from silicosis in the industrial branches that process or produce crystalline $SiO_2$, in addition to the observance of limits for occupational exposures as defined by the authorities.

Reactive silanol groups on the $SiO_2$ surface have been described by Schlipköter and Brockhaus (1961) as a very important triggering factor of pathological effects. Thus, the deactivation thereof could lead to a reduction of the risk in the processing of $SiO_2$.

JP 2005263566 describes a process for preventing the solidification of silica dust by treating the silica dust with polyalkylene glycol. The silica dust described is an amorphous material having a particularly small grain size.

In the literature, polyvinylpyridine N-oxides and aluminum salts, such as aluminum lactate, were repeatedly tested for the surface modification of quartz and thus for the prevention of silicosis. However, it has not been possible to date to show sufficient in vivo effectiveness for such non-covalently bonded substances (Weller (1975) Long-term test on rhesus monkeys for the PVNO therapy of anthracosilicosis. Inhaled Part; 4(1): 379-87, 1975; Zhao et al. (1983) Long-term follow-up observations of the therapeutic effect of PVNO on human silicosis. Zentralbl Bakteriol Mikrobiol Hyg B; 178(3): 259-62; Prügger et al. (1984) Polyvinylpyridine N-oxide (Bay 3504, P-204, PVNO) in the treatment of human silicosis. Wien Klin Wochenschr; 96(23): 848-53; Bégin et al. (1986) Aluminum lactate treatment alters the lung biological activity of quartz. Exp Lung Res; 10: 385-99; Goldstein and Rendall (1987) The prophylactic use of polyvinylpyridine-N-oxide (PVNO) in baboons exposed to quartz dust. Environ Res; 42(2): 469-81; Dubois et al. (1988) Aluminum inhalation reduces silicosis in a sheep model. Am Rev Respir Dis; 137(5): 1172-9; Dufresne et al. (1994) Influence of aluminum treatments on pulmonary retention of quartz in sheep silicosis. Exp Lung Res; 20(2): 157-68; Bégin et al. (1995) Further information on aluminum inhalation in silicosis. Occup Environ Med; 52(11): 778-80).

Thus, there is still a need for more effective solutions for the modification of crystalline $SiO_2$ flours towards a lower potential of the flours to produce undesirable biological effects.

It has been an object of the present invention to provide such a process.

This object is achieved by a process for treating crystalline silicon dioxide, comprising the step of grinding a crystalline silicon dioxide together with from 0.05 to 1.00% by weight of a substance selected from the group consisting of polyhydric alcohols, kaolin, aluminum alcoholates, and mixtures thereof.

Thus, according to the invention, a crystalline silicon dioxide is ground together with a polyhydric alcohol, aluminum alcoholate or kaolin. This serves for the intimate mixing and immediate reaction of the polyhydric alcohol, aluminum alcoholate and/or kaolin with crystalline silicon dioxide and its freshly broken/generated surface.

In this step, the actual change in grain size of the crystalline silicon dioxide by the grinding step is of minor importance, while the breaking to generate reactive surfaces is important.

Suitable grain sizes for the crystalline silicon dioxide flour are d50 grain sizes within a range of from 0.2 to 90 µm, more preferably 0.3 to 10 µm, after the grinding.

d50 means the grain size in which 50% by volume is larger than the given D50 value, and 50% by volume is smaller than the D50 value. Such values can be obtained by laser diffractometry.

Typically, the d90 value of such ground silicon dioxide materials is about twice to three times the d50 value, the d95 value is about five times as high. If a document describes 1 µm as the upper limit of the grain size, this means a d50 value on the order of at most 0.3 µm, probably even smaller. Usual values for such materials are:

d50=0.5 µm→d90=1 µm
d50=2 µm→d90=6 µm
d50=3 µm→d90=10 µm.

Materials having a d50 grain size within a range of 0.5 µm or smaller cannot be effectively comminuted any more by mechanical processes.

Preferably, the product obtained according to the invention has a d90 of 1 µm or more, preferably 2 µm or more. For example, the d90 value may be in the range of 1 to 30 µm, preferably 1 to 15 µm after grinding.

"Crystalline silicon dioxide" as used in the present invention means a silicon dioxide that has at least 70% of a crystalline mass proportion. The crystalline proportion is measured by X-ray diffraction. Preferably, the crystalline proportion is at least 75% by mass.

The determination of the crystalline proportion of the silicon dioxide may be effected by the method described in the experimental part.

Particularly preferred silicon dioxides include quartz, cristobalite or tridymite, especially in the form of flours.

Glycerol and polyethylene glycols or polypropylene glycols, in particular, are suitable as said polyhydric alcohols. Mixtures of these substances or copolymers may also be employed.

The use of glycerol or polyethylene glycols is preferred.

Suitable polyethylene glycols include, in particular, PEG200, PEG300, PEG500, PEG1500, PEG35000, and mixtures thereof.

Preferably, said polyhydric alcohol has a molar mass within a range of from 92 to 50,000 g/mol. Kaolin is a white rock whose main component is kaolinite, a platelet-shaped alumosilicate having a grain size (d50) smaller than 10 μm. Kaolins having a d50 of smaller than 2 μm are preferred.

Aluminum tri-isopropanolate (aluminum tris-isopropoxide), in particular, is a suitable aluminum alcoholate.

Surprisingly, it has been shown that the cytotoxic and pro-inflammatory potential of the crystalline silicon dioxide flour can be reduced by the process according to the invention.

The cytotoxic and pro-inflammatory potential can be measured by methods described in the experimental part of the application. This method was performed on the samples and standards by the Fraunhofer Institut für Toxikologie and Experimentelle Medizin ITEM (Hanover, Germany).

The invention also relates to a formulation of crystalline silicon dioxide, comprising crystalline silicon dioxide and from 0.05 to 1.00% by weight of a substance selected from the group consisting of polyhydric alcohols, aluminum alcoholates, kaolin, and mixtures thereof.

Such a formulation according to the invention comprises at least 97% by weight silicon dioxide, preferably at least 98% by weight silicon dioxide, or 99% by weight or more silicon dioxide, as measured by the X-ray fluorescence method.

The degree of crystallinity of this silicon dioxide is at least 70% by weight or more, as measured by the X-ray diffraction method.

The formulation of crystalline silicon dioxide according to the invention also has a preferred d50 grain sizes within a range of from 0.2 to 90 μm, measured as d50, more preferably within a range of from 0.3 to 10 μm.

The invention further relates to the use of polyhydric alcohols, aluminum alcoholate and/or kaolin for reducing the cytotoxic and pro-inflammatory potential of the crystalline silicon dioxide, and to a formulation of crystalline silicon dioxide obtainable by the process according to the invention.

MATERIALS

Figure 1:
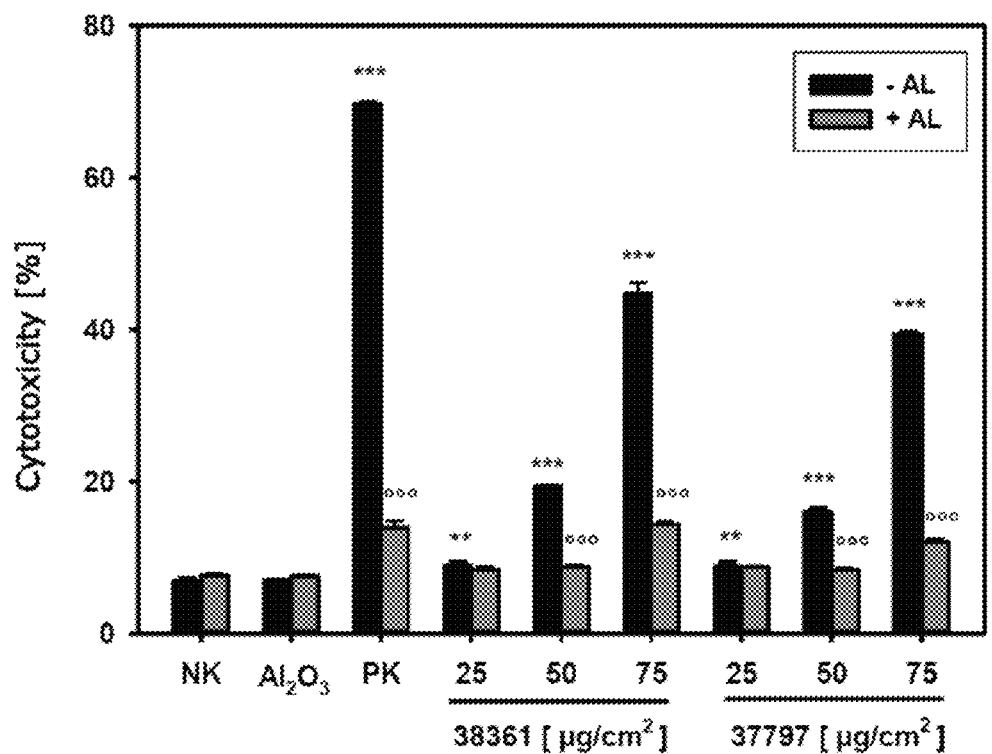
FIG. 1 shows the LDH release for measuring the induction of membrane damage by standard materials.

Negative Control (Sample: 1): D-MEM Cell Culture Medium+10% FCS

As a non-particulate negative/vehicle control, Dulbecco's Minimum Essential Medium (D-MEM) was used with high glucose (4.5 g/l), GlutaMax™ and sodium pyruvate (110 mg/l) from Life Technologies GmbH (Darmstadt, Germany) according to the literature (Ziemann et al, 2017, and Ziemann C, Reamon-Buettner S M, Tillmann T et al. (2014b) The SILICOAT project: In vitro and in vivo toxicity screening of quartz varieties from traditional ceramics industry and approaches for an effective quartz surface coating. Naunyn Schmiedebergs Arch Pharmacol; 387 (Suppl 1): p. 23).

Particulate Negative Control (Sample: 2): Aluminum Oxide ($Al_2O_3$)

In order to be able to delimit general particulate effects from quartz-induced effects, aluminum oxide ($Al_2O_3$; "aluminum oxide powder, <10 mm, 99.5% trace metal basis"; Sigma-Aldrich Chemie GmbH, Munich) was carried along as a particulate negative control. In vitro studies had shown that $Al_2O_3$ has almost no adverse biological activity in the model system employed (Ziemann et al., 2009; Ziemann et al., 2014; Ziemann et al., 2017).

Positive Control (Quartz Effects; Sample: 3): Quartz DQ12 (DQ12)

As the positive control for quartz-dependent effects, there was employed Quartz DQ12 from Dörentrup (87% α-quartz, 13% amorphous $SiO_2$; mass average geometric diameter: 2.99±1.53 μm, Bergbauforschung, Essen, Germany), which represents an accepted positive standard for experimental toxicology in Europe (Robock (1973), Standard quartz DQ12<5 μm for experimental pneumoconiosis research projects in the Federal Republic of Germany. Ann Occup Hyg; 16: 63-6; Clouter et al. (2001) Inflammatory effects of respirable quartz collected in workplaces versus standard DQ12 quartz: particle surface correlates. Toxicol Sci; 63: 90-8; Creutzenberg et al. (2008) Toxicity of a quartz with occluded surfaces in a 90-day intratracheal instillation study in rats. Inhal Toxicol; 20: 995-1008). DQ12 is able to reproducibly induce DNA and membrane damage in the model system employed (Monfort et al., 2008; Ziemann et al., 2009, 2014 and 2017), and to provoke inflammatory reactions in a rat's lung.

Quenching of Quartz-Dependent Effects: Aluminum Lactate (AL)

In order to be able to distinguish quartz-dependent biological effects from effects not mediated by quartz, each quartz flour sample was tested±aluminum lactate (AL; 100 μM; Sigma-Aldrich Chemie GmbH, Munich). The inactivating effect of AL on quartz-dependent biological effects could be confirmed repeatedly in primary alveolar macrophages (AM) from the rat (Monfort et al., 2008; Ziemann et al., 2009; Ziemann et al., 2014; Ziemann et al., 2017).

Positive Control (Membrane Damage): Triton X-100

The cells were treated with Triton X-100 as a positive control (high control) and calculation reference (100% cytotoxicity) for experiments relating to lactate dehydrogenase (LDH) release. By treating cells with this non-ionic surfactant, the cell membrane is damaged completely, and any normally intracellularly localized lactate dehydrogenase (LDH) enzyme present is released.

Test Substances

| Sample | Grinding | Grinding media | Concentration based on quartz [%] |
|---|---|---|---|
| 37797 | ball mill (Alubit grinding media) | none | — |
| 37935 | ball mill (Alubit grinding media) | Polyglycol 35000 S made by Clariant Material No. 107915 | 0.4 |

-continued

| Sample | Grinding | Grinding media | Concentration based on quartz [%] |
|---|---|---|---|
| 38132 | ball mill (Alubit grinding media) | Tetraethylsilicate CAS No. 78-10-4 Wacker ® TES 28 ETHYLSILIKAT | 0.4 |
| 38157 | ball mill (Alubit grinding media) | Silica sol Ludox ® TM-50 made by Grace | 0.4 |
| 38174 | ball mill (Alubit grinding media) | Glycerol CAS No. 56-81-5 | 0.4 |
| 38193 | ball mill (Alubit grinding media) | Aluminum trisisopropoxide CAS No. 555-31-7 | 0.4 |
| 38272 | ball mill (Alubit grinding media) | Kaolin KBE-1 made by Amberger Kaolinwerke | 0.4 |
| 38287 | ball mill (Alubit grinding media) | Epsilon-caprolactam CAS No. 105-60-2 | 0.4 |
| 38328 | ball mill (Alubit grinding media) | 3-(Triethoxy-silyl)propyl-succinic anhydride CAS No. 93642-68-3 Geniosil ® GF 20 made by Wacker | 0.4 |
| 38423 | air jet mill autogenously | none | — |
| 38360 | ball mill (Alubit grinding media) | Alkylsilicone resin with alkoxy groups Silres ® BS 1260 made by Wacker | 0.4 |
| 38361 | industrial standard purchased Dörentrup DQ12 | (presumably none) | — |

The products had a unitary mean particle size d50 of 2 µm.

Sterility Test and Test of the Endotoxin Content

At first, the crystalline silicon dioxides were examined for sterility and endotoxin content, because a corresponding contamination may lead to non-specific effects in in-vitro testing. In particular, end points for testing the pro-inflammatory potential may be affected by artefacts. For testing sterility, the samples were incubated in thioglycolate broth, which supports the growth of a broad range of bacteria and fungi, at 34-35° C. for 14 days. Cultures that had been inoculated with *Staphylococcus aureus* served as a positive control. The evaluation was performed after 14 days by visual inspection (turbidity, morphological fungal growth).

In addition, the endotoxin content was determined by "Kinetic Chromogenic LAL Assay", Method D (see Section 2.6.14 of European Pharmacopoeia), by an independent laboratory (Lonza, Verviers, Belgium) in three stages of dilution, because endotoxins could also produce immune responses as artefacts of the in-vitro experiments.

Treatment Solutions

Precultures of AM were prepared according to Ziemann et al., 2017, and the test and reference materials were cautiously added as doubly concentrated particle suspensions after deagglomeration by ultrasound. Three different concentrations (25, 50 and 75 µg/cm$^2$) of each of the particles were added in order to elucidate the optimum range of sensitivity of the LDH release and Cxcl2 gene expression. After preliminary experiments, said range was set at 75 µm/cm$^2$ in order to ensure sufficient responses for a differentiation between the different samples.

All testing and reference materials were examined in the presence and absence of aluminum lactate (AL).

Cell System

Primary alveolar macrophages (AM) from a rat's lung were employed as a quartz-relevant in-vitro cell model. Cultured AM from the rat represent a very sensitive in-vitro model system for the screening of quartz and cristobalite effects, which could be shown in many instances (e.g., Ziemann et al., 2009; Ziemann et al., 2014; Ziemann et al., 2017).

The recovery and culturing of the AM and addition of particle suspensions and further culturing was effected according to the explanations in Ziemann et al., 2017.

Methods:

Determination of the Crystalline Fraction by X-Ray Diffraction

The determination of the crystalline fraction of silicon dioxide was effected by analogy with "SOP No. A04 Röntgendiffraktometrische Quarzfeinstaubbestimmung gemäß BGIA 8522-Bestimmung von Cristobalit and Tridymit im A-Staub sowie Analyse kristalliner Kieselsäuren in Materialproben; Dr. M. Kirchner, IGF Analytik Dr. H.-H. Fricke, IGF Analytik T. Faak; IGF Analytik; 04/2014" and "ISO STANDARD 24095; First edition 2009-12-15; Workplace air—Guidance for the measurement of respirable crystalline silica".

The identification and quantification of crystalline phases in mineral fillers is effected in the central laboratory of the Quarzwerke GmbH by means of an X-ray diffractometer of the type D4 Endeavor of the company Bruker AXS with Bragg-Brentano geometry using a copper X-ray tube.

The samples were measured as pressed powder pellets, which were either pressed into a steel ring with an automated sample preparation device from the company Herzog, or manually coated into a sample holder by using a glass slide.

The qualitative evaluation of the diffractograms was effected using the software DIFFRAC.EVA Version 4 from the company Bruker AXS using the ICDD structural data base PDF-2 (Release 1998).

Quantitative analyses were performed by the Rietveld method (TOPAS 5 from Bruker AXS), by the addition method (according to DIN 32633), or by means of calibrations (DIFFRAC.DQUANT Vers. 1 from Bruker AXS).

Lactate Dehydrogenase (LDH) Release

LDH Release

After incubation of the primary alveolar macrophages of the rat with the test and reference materials, the LDH activity in the incubation supernatants was determined by colorimetry.

Detection of an increased enzyme activity in the cell culture supernatant indicates damage to the cell membrane, which can be induced by direct quartz-cell membrane interaction with reactive quartz flours.

In addition to its being readily determined and its reliability, this end point offers the advantage that it can be employed as both in-vitro and early in-vivo end point in lung lavage, and thus allows for correlations between data generated in-vitro and in-vivo.

The "Cytotoxicity Detection Kit (LDH)" from the company Roche Applied Science (Mannheim, Germany) was employed to determine the LDH activity in accordance with the manufacturer's instructions.

The data represent means±SD of 3 independent cultures, which were each analyzed in triplicate.

Finally, cells that were lysed completely by a Triton X-100 treatment served as a positive control for calculating the percent cytotoxicity. All measured values from the treated samples were finally based on the value for the cells treated with Triton X-100.

Cxcl2 Gene Expression
Cxcl2 RTqPCR (Δ-CT Method)

In order to evaluate the biological activity of the quartz flour samples having different surface modifications, the determination of gene expression for the pro-inflammatory "C-X-C motif chemokine ligand 2" (Cxcl2) gene by means of RT-qPCR was selected as a further end point. The pro-inflammatory protein Cxcl2 is produced by activated macrophages and has an attracting effect on polymorphonuclear neutrophils (PMN). The number and percentage of PMNs is an important in vivo end point. For example, in the case of quartz-exposed animals, the degree of adverse biological activity of quartz in the lungs can be estimated in a highly revealing way by means of PMN counting in the lung lavage fluid. This has been shown already in an EU project (SILICOAT). For quartz-dependent Cxcl2 (MIP-2) responses, see also Driscoll et al. (1996) Alpha-quartz-induced chemokine expression by rat lung epithelial cells: effects of in vivo and in vitro particle exposure. Am J Pathol. 149(5): 1627-37.

After an initial growing period of 24 hours, the AM were incubated with the test and reference materials for 4 hours. The Cxcl2 and Hprt1 gene expression was subsequently determined and calculated by means of RT-qPCR. The data originate from the means of 3 technical replicates per condition. The evaluation was performed according to the comparative CT method (Schmittgen T D, Livak K J. (2008) Analyzing real-time PCR data by the comparative C(T) method. Nat Protoc. 3:1101-1108)), in which linearity and efficiency were also tested.

The information relating to the primers is listed in the following Table:

| Gene name | NCBI RefSeq | Ordering firm | Unique Assay ID | Product length |
|---|---|---|---|---|
| Cxcl2 | NM_053647 | BioRad | gRnoCED0003624 | 102 bp |

| Gene name | NCBI RefSeq | Forward primer | Revers primer | Product length |
|---|---|---|---|---|
| Hprt | NM_012583 | CTGTCATGTCGACCCTCAGT | TCGAGCAAGTCTTTCAGTCC | 158 bp |

Statistics

In the case of LDH release, the results are represented in the graphics as means±the related standard deviation (SD) from three cultures, which were in turn measured in triplicate or in duplicate.

Statistical analyses were performed using the SigmaStat 3.1® Software (Systat Software, Inc., Point Richmond, USA). A statistical evaluation of the results was effected by means of Student's t-test. A two-sided unpaired t-test was applied to both the determination of statistically significant differences for particulate negative control, and the evaluation of significant differences between AL-treated and AL-untreated cultures, and between the reference quartz 37797 and the surface-modified quartz flour samples. With an error probability of below 5% ($p<0.05$), the results were rated statistically significant.

Results and Discussion

At first, all 12 delivered quartz flour samples were examined for sterility and their endotoxin content, because a corresponding contamination of the quartz flours may lead to artificial biological effects in in-vitro testing.

Based on the in-house performed sterility examination and endotoxin testing, none of the quartz flour samples examined showed contamination with bacteria, fungi or endotoxin. Thus, artificial biological effects based on corresponding contaminants are nearly excluded.

In a pilot experiment, the biological activity of the reference quartz (37797; fresh, quartz flour ground without grinding media) was characterized in an in-vitro model system (AM) on the one hand, and an optimum test concentration for the further measurements was determined.

The reference quartz flours 37797, 38361 (DQ12 QW) and DQ12 (Fraunhofer ITEM) were included as a positive control, and $Al_2O_3$ (75 µg/cm$^2$) was included as a particulate negative control.

With respect to the quartz flour samples 37797 and 38361, it became clear that a concentration of 75 µg/cm$^2$ should be sought in all experiments, because only at this concentration there could be found a significant increase of Cxcl2 gene expression by 37797 (36.43 [2^-CT×10^2]) as compared to the particulate negative control (2.88 [2^-CT×10^2]), which could in turn be inhibited completely by the presence of AL (2.77 [2^-CT×10^2]), which suggested a quartz specificity of the effect.

At optimized test concentrations, the comparative in-vitro screening of a total of twelve differently ground/surface-modified quartz flours for their cytotoxic and pro-inflammatory potential was performed. The LDH release and Cxcl2 gene expression were evaluated in order to be able to make clear statements despite certain limitations of the individual methods.

In addition, significance testing as compared to the particulate negative control $Al_2O_3$ and testing for significant differences between the AL-treated and untreated quartz flour samples were performed in order to obtain information about the actual quartz dependence of effects.

Lactate Dehydrogenase (LDH) Release

After incubation of AM with 75 µ/cm$^2$ of the test and reference materials for four hours, the end point LDH release yielded a very clear picture. While the negative control (cell culture medium) and the particulate negative control ($Al_2O_3$) had low cytotoxicity values of 5.3±0.10 and 4.6±0.29%, which indicated a good vitality of the cells, a significantly higher LDH activity could be detected in the incubation supernatant for all "active" samples (DQ12 33797, 38423 and 38361) as compared to the particulate negative control ($P≤0.001$; see FIG. 2). With 61.6±0.27 and 48.7±2.95% cytotoxicity, the positive control (DQ12) and the sample 38361 (DQ12 QW—positive blank) induced the most severe membrane damage. Sample 38423 (quartz freshly ground autogenically on an air jet mill) also exhibited a high cytotoxicity of 30.1±6.25%, as could be expected. The reference quartz flour 37797 (quartz freshly ground on a ball mill) with 16.0±0.42% cytotoxicity in the main measurement (FIG. 2) was clearly less active than it was in the first measurements for determining active concentration ranges (FIG. 1) (39.4±0.38%), which could indicate an ageing effect. However, the intensity of the remaining membrane-damaging effect allowed for a clear differentiation from the surface-modified samples. By a parallel treatment of the cells with AL, the membrane-damaging effects of the "active" quartz flour samples could be suppressed almost completely.

Sample 37935 (treating agent: Polyglycol 35000 S) showed no more cytotoxicity than the particulate negative control $Al_2O_3$ and the negative control (without particles). 38174 (treating agent: glycerol) also showed no negative effect, followed by 38193 (treating agent: Al tris-isopropoxide) and 38272 (treating agent: kaolin KBE-1).

Cxcl2 Gene Expression

The Cxcl2 gene expression of the cultures treated with quartz flour was determined as a further end point.

Figure 2:
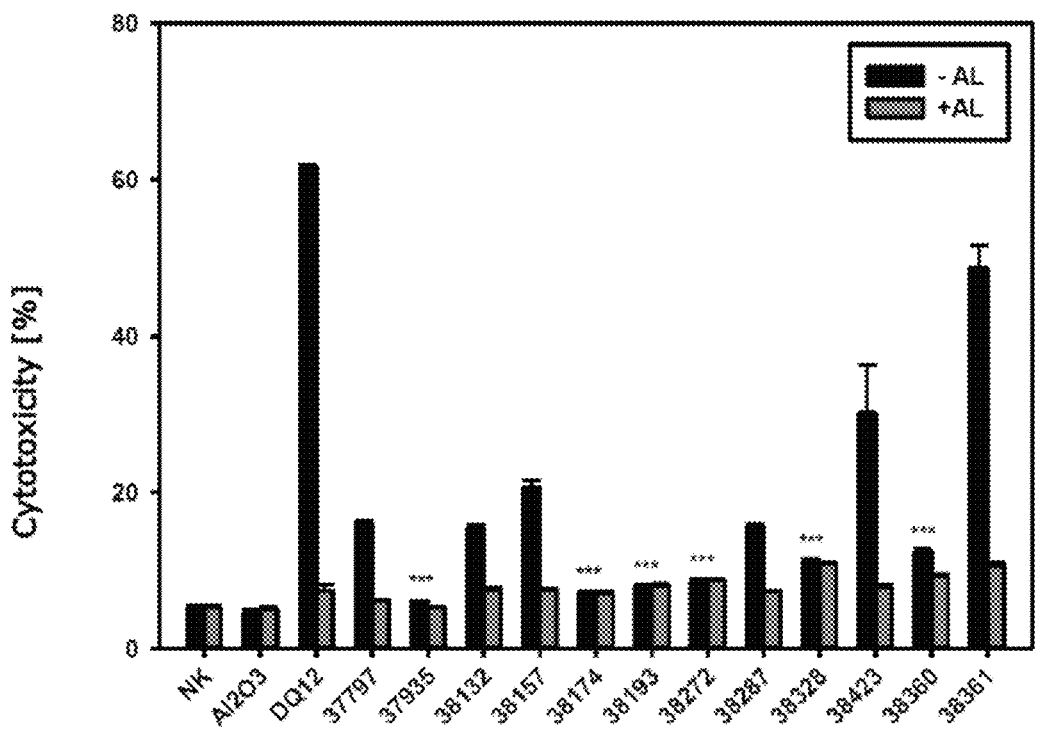
FIG. 2 shows the LDH release for measuring the induction of membrane damage by various quartz flour samples as compared with standards.
Figure 3:
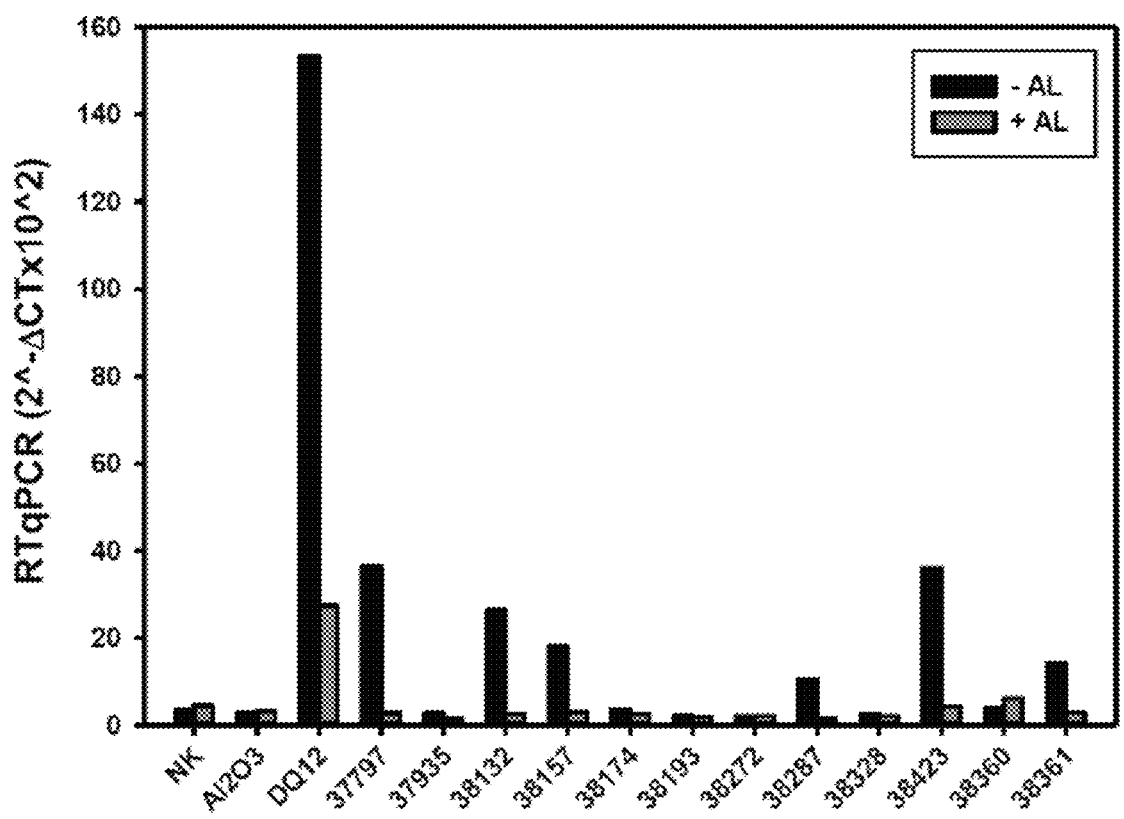
FIG. 3 shows the Cxcl2 RTqPCR (Δ-CT method) for measuring the induction of Cxcl2 gene expression by various quartz flour samples in primary alveolar macrophages of the rat, based on the Hprt1 gene as a reference gene.

If the pure Cxcl2 gene expression data are considered, all the quartz flour samples that were "active" by definition (DQ12, 37797, 38423 and 38361) showed a clear induction of Cxcl2 gene expression (FIG. 3). In particular, the reference quartz 37797 (quartz freshly ground on a ball mill without a treating agent), as compared to the particulate negative control $Al_2O_3$ (2.88 [2^-CT×10^2]), exhibited a very significant increase of Cxcl2 gene expression to 36.43 [2^-CT×10^2], which could be inhibited by AL almost completely (2.77 [2^-CT×10^2]). The non-particulate negative control showed a gene expression of 3.43 [2^-CT×10^2]. The clearly weaker result of the Cxcl2 gene expression of sample 38361 as compared to DQ12 may be explained with ageing of the sample. Sample 38361 showed lower responses as compared to DQ12 already in both cytotoxicity experiments (FIGS. 1 and 2). In Cxcl2 gene expression, this effect is visible to a still enhanced extent.

Thus, based on the data of the Cxcl2 gene expression, a differentiation of the surface-modified quartz flours was very well possible. In contrast to the positive control 37797, the samples 37935 (treating agent: Polyglycol 35000 S) with 2.68 [2^-CT×10^2], 38174 (treating agent: glycerol) with 3.65 [2^-CT×10^2], 38193 (treating agent: Al tris-isopropoxide) with 2.22 [2^-CT×10^2], 38272 (treating agent: kaolin KBE-1) with 1.95 [2^-CT×10^2]) and 38328 (treating agent: 3-(triethoxysilyl)propylsuccinic anhydride) with 2.54 [2^-CT×10^2] showed a very low induction of Cxcl2 gene expression and thus a low pro-inflammatory potential. In contrast, in samples 38132 (treating agent: tetraethylsilicate) with 26.39 [2^-CT×10^2], 38157 (treating agent: silica sol) with 18.02 [2^-CT×10^2] and 38287 (epsilon-caprolactam) with 10.45 [2^-CT×10^2], a significant increase of Cxcl2 gene expression was evident, which could be inhibited significantly by AL in all cases and thus appeared to be based on a quartz-dependent mechanism.

CONCLUSION

If both in-vitro end points (LDH cytotoxicity as a primary effect and Cxcl2 gene expression as a secondary effect) are considered, treatment of crystalline $SiO_2$ with Polyglycol (sample 37935) or with glycerol (sample 38174) showed the same good quenching activity. Thus, negative effects of the thus modified crystalline $SiO_2$ particles on alveolar macrophages of the rat could no longer be detected in vitro. Thus, with effects of the same magnitude as the negative controls (culture medium and $Al_2O_3$), the mentioned surface modifications mediated the highest reduction of the cytotoxic and pro-inflammatory potential of crystalline $SiO_2$. Also a good "sequestering potential" for those sites of the $SiO_2$ surfaces that were active in a negative sense (i.e., generating biologically adverse effects) was exhibited by the aluminum compounds Al tris-isopropoxide (sample 38913) and kaolin KBE-1 (sample 38272).

The invention claimed is:

1. A process for treating crystalline silicon dioxide to reduce risk of silicosis from inhalation, comprising the step of grinding a crystalline silicon dioxide together with from 0.05 to 1.00% by weight of a substance selected from the group consisting of glycerol, kaolin, aluminum alcoholates, and mixtures thereof, wherein said crystalline silicon dioxide has a d50 grain size within a range of from 0.2 to 90 μm after grinding.

2. The process according to claim 1, wherein said crystalline silicon dioxide has at least 70% of a crystalline proportion.

3. The process according to claim 1, wherein said crystalline silicon dioxide is selected from the group consisting of quartz, cristobalite, and tridymite.

4. The process according to claim 1, wherein said process reduces a cytotoxic and pro-inflammatory potential of the crystalline silicon dioxide.

5. The process according to claim 1, wherein said crystalline silicon dioxide has a d50 grain size within a range of from 0.3 to 10 μm after grinding.

6. The process according to claim 1, wherein said crystalline silicon dioxide has a d90 grain size within a range of from 1 to 300 μm after grinding.

7. The process according to claim 1, wherein said crystalline silicon dioxide has a d90 grain size within a range of from 1 to 15 μm after grinding.

8. The process according to claim 1, wherein the substance is selected from the group consisting of kaolin, aluminum alcoholates, and mixtures thereof.

9. The process according to claim 1, wherein the grinding is performed in a ball mill.

10. The process according to claim 1, wherein the substance is glycerol.

11. A formulation of crystalline silicon dioxide, comprising crystalline silicon dioxide and from 0.05 to 1.00% by weight of a substance selected from the group consisting of glycerol, aluminum alcoholates, kaolin, and mixtures thereof.

12. The formulation of crystalline silicon dioxide according to claim 11, comprising at least 97% by weight of silicon dioxide.

13. The formulation of crystalline silicon dioxide according to claim 11, comprising silicon dioxide with at least 70% of a crystalline proportion.

14. The formulation of crystalline silicon dioxide according to claim 11, wherein said crystalline silicon dioxide has a d50 grain size within a range of from 0.2 to 90 μm.

15. The formulation of crystalline silicon dioxide according to claim 11, wherein said crystalline silicon dioxide has a d50 grain size within a range of from 0.3 to 10 μm.

16. The formulation of crystalline silicon dioxide according to claim 11, wherein the substance is selected from the group consisting of aluminum alcoholates, kaolin, and mixtures thereof.

17. The formulation of crystalline silicon dioxide according to claim 11, wherein the substance is glycerol.

18. A formulation of crystalline silicon dioxide obtainable by the process according to claim 1.

* * * * *

SEQUENCE LISTING

```
<160> NUMBER OF SEQ ID NOS: 2

<210> SEQ ID NO 1
<211> LENGTH: 20
<212> TYPE: DNA
<213> ORGANISM: Artificial Sequence
<220> FEATURE:
<223> OTHER INFORMATION: Primer

<400> SEQUENCE: 1
ctgtcatgtc gaccctcagt                                              20

<210> SEQ ID NO 2
<211> LENGTH: 20
<212> TYPE: DNA
<213> ORGANISM: Artificial Sequence
<220> FEATURE:
<223> OTHER INFORMATION: Primer

<400> SEQUENCE: 2
tcgagcaagt ctttcagtcc                                              20
```